(12) United States Patent  
Thantry et al.

(10) Patent No.: US 11,579,802 B2  
(45) Date of Patent: Feb. 14, 2023

(54) PIPELINE USING MATCH-ACTION BLOCKS

(71) Applicant: Fungible, Inc., Santa Clara, CA (US)

(72) Inventors: Hariharan Lakshminarayanan Thantry, Fremont, CA (US); Srihari Raju Vegesna, San Jose, CA (US); Sureshkumar Nedunchezhian, San Jose, CA (US); Stimit Kishor Oak, San Jose, CA (US)

(73) Assignee: FUNGIBLE, INC., Santa Clara, CA (US)

( * ) Notice: Subject to any disclaimer, the term of this patent is extended or adjusted under 35 U.S.C. 154(b) by 189 days.

(21) Appl. No.: 17/061,725

(22) Filed: Oct. 2, 2020

(65) Prior Publication Data

US 2021/0103408 A1   Apr. 8, 2021

Related U.S. Application Data

(60) Provisional application No. 62/911,082, filed on Oct. 4, 2019.

(51) Int. Cl.
*G06F 3/06* (2006.01)
*H04L 69/22* (2022.01)
(Continued)

(52) U.S. Cl.
CPC .......... *G06F 3/0659* (2013.01); *G06F 3/061* (2013.01); *G06F 3/067* (2013.01); *G06F 13/20* (2013.01); *H04L 69/22* (2013.01); *H04L 49/90* (2013.01)

(58) Field of Classification Search
None
See application file for complete search history.

(56) References Cited

U.S. PATENT DOCUMENTS 5,351,243 A   9/1994   Kalkunte et al.
5,805,808 A   9/1998   Hasani et al.
(Continued)

FOREIGN PATENT DOCUMENTS

WO   2013019981 A1   2/2013
WO   2013019996 A1   2/2013
(Continued)

OTHER PUBLICATIONS

Alicherry et al., "High Speed Pattern Matching for Network IDS/IPS," Proceedings of IEEE International Conference on Netwok Protocols, Nov. 2006, pp. 187-196.
(Continued)

*Primary Examiner* — Elias Mamo
(74) *Attorney, Agent, or Firm* — Shumaker & Sieffert, P.A.

(57) ABSTRACT

An apparatus includes an output bus configured to store data, a match table, one or more storage devices, and logic. The match table is configured to store a plurality of entries, each entry including a key value, wherein the match table specifies a matching entry in response to being queried by the query data. The one or more storage devices are configured to store operation information for each of the plurality of entries stored in the match table. The operation information specifies one or more instructions associated with each respective entry in the plurality of entries stored in the match table. The logic is configured to receive one or more operands from the output bus, identify one or more instructions from the one or more storage devices, and generate, based on the one or more instructions and the one or more operands, processed data.

20 Claims, 9 Drawing Sheets

(51) Int. Cl.
*G06F 13/20* (2006.01)
*H04L 49/90* (2022.01)

(56) References Cited

U.S. PATENT DOCUMENTS

| | | | |
|---|---|---|---|
| 6,091,707 | A | 7/2000 | Chandan et al. |
| 7,187,694 | B1 | 3/2007 | Liao |
| 7,610,269 | B1 | 10/2009 | Gupta et al. |
| 8,472,452 | B2 | 6/2013 | Goyal et al. |
| 8,606,959 | B2 | 12/2013 | Goyal et al. |
| 8,711,861 | B2 | 4/2014 | Goyal et al. |
| 8,719,331 | B2 | 5/2014 | Goyal et al. |
| 8,923,306 | B2 | 12/2014 | Bouchard et al. |
| 8,934,488 | B2 | 1/2015 | Goyal et al. |
| 8,937,952 | B2 | 1/2015 | Goyal et al. |
| 8,937,954 | B2 | 1/2015 | Goyal et al. |
| 8,954,700 | B2 | 2/2015 | Ansari et al. |
| 8,995,449 | B2 | 3/2015 | Goyal et al. |
| 9,031,075 | B2 | 5/2015 | Goyal et al. |
| 9,130,819 | B2 | 9/2015 | Pangborn et al. |
| 9,137,340 | B2 | 9/2015 | Goyal et al. |
| 9,191,321 | B2 | 11/2015 | Goyal et al. |
| 9,195,939 | B1 | 11/2015 | Goyal et al. |
| 9,208,438 | B2 | 12/2015 | Goyal et al. |
| 9,225,643 | B2 | 12/2015 | Goyal et al. |
| 9,268,855 | B2 | 2/2016 | Goyal et al. |
| 9,275,336 | B2 | 3/2016 | Goyal et al. |
| 9,319,316 | B2 | 4/2016 | Ansari et al. |
| 9,344,366 | B2 | 5/2016 | Bouchard et al. |
| 9,391,892 | B2 | 7/2016 | Ansari et al. |
| 9,432,284 | B2 | 8/2016 | Goyal et al. |
| 9,497,117 | B2 | 11/2016 | Goyal et al. |
| 9,525,630 | B2 | 12/2016 | Ansari et al. |
| 9,531,647 | B1 | 12/2016 | Goyal et al. |
| 9,531,690 | B2 | 12/2016 | Ansari et al. |
| 9,531,723 | B2 | 12/2016 | Bouchard et al. |
| 9,544,402 | B2 | 1/2017 | Worrell et al. |
| 9,595,003 | B1 | 3/2017 | Bullis et al. |
| 9,596,222 | B2 | 3/2017 | Goyal et al. |
| 9,614,762 | B2 | 4/2017 | Goyal et al. |
| 9,647,947 | B2 | 5/2017 | Goyal et al. |
| 9,729,527 | B2 | 8/2017 | Goyal et al. |
| 9,866,540 | B2 | 1/2018 | Bouchard et al. |
| 10,565,112 | B2 | 2/2020 | Noureddine et al. |
| 10,659,254 | B2 | 5/2020 | Sindhu et al. |
| 10,958,770 | B2 | 3/2021 | Thantry et al. |
| 2005/0165966 | A1 | 7/2005 | Gai |
| 2006/0010193 | A1 | 1/2006 | Sikdar et al. |
| 2009/0300759 | A1 | 12/2009 | Wang et al. |
| 2011/0116507 | A1 | 5/2011 | Pais et al. |
| 2013/0282766 | A1 | 10/2013 | Goyal et al. |
| 2014/0098824 | A1 | 4/2014 | Graham |
| 2014/0122791 | A1 | 5/2014 | Fingerhut et al. |
| 2014/0214159 | A1 | 7/2014 | Vidlund et al. |
| 2014/0241358 | A1* | 8/2014 | Bosshart ........... H04L 45/74591 370/392 |
| 2014/0369363 | A1 | 12/2014 | Hutchison et al. |
| 2015/0106677 | A1 | 4/2015 | Greenfield et al. |
| 2016/0191306 | A1 | 6/2016 | Gasparakis et al. |
| 2016/0283391 | A1 | 9/2016 | Nilsson et al. |
| 2017/0063690 | A1 | 3/2017 | Bosshart |
| 2018/0074754 | A1* | 3/2018 | Crawford, Jr. ......... G06F 3/0611 |
| 2018/0165381 | A1* | 6/2018 | Venkatesh ......... G06F 16/90339 |
| 2018/0293168 | A1 | 10/2018 | Noureddine et al. |
| 2018/0329868 | A1* | 11/2018 | Chen ..................... G06F 17/16 |
| 2019/0012278 | A1 | 1/2019 | Sindhu et al. |
| 2019/0013965 | A1 | 1/2019 | Sindhu et al. |
| 2019/0104206 | A1 | 4/2019 | Goel et al. |
| 2019/0213151 | A1 | 7/2019 | Inoue et al. |
| 2019/0289102 | A1 | 9/2019 | Goel et al. |
| 2019/0379770 | A1 | 12/2019 | Thantry et al. |
| 2020/0120191 | A1 | 4/2020 | Thantry et al. |
| 2020/0183841 | A1 | 6/2020 | Noureddine et al. |
| 2020/0280462 | A1 | 9/2020 | Sindhu et al. |
| 2021/0224069 | A1* | 7/2021 | Chen ..................... G06F 9/30032 |

FOREIGN PATENT DOCUMENTS

| | | |
|---|---|---|
| WO | 2013020001 A1 | 2/2013 |
| WO | 2013020002 A1 | 2/2013 |
| WO | 2013020003 A1 | 2/2013 |
| WO | 2018/020645 A1 | 2/2018 |

OTHER PUBLICATIONS

Bosshart et al., "Forwarding Metamorphosis: Fast Programmable Match-Action Processing in Hardware for SDN," Proceedings of the ACM SIGCOMM 2013 conference on SIGCOMM, Aug. 12-16, 2013, 12 pp.

Gibb et al., "Design Principles for Packet Parsers," Architectures for Networking and Communications Systems, IEEE, Oct. 21-22, 2013, 12 pp.

Kozanitis et al., "Leaping Multiple Headers in a Single Bound: Wire-Speed Parsing Using the Kangaroo System," INFOCOM'10 Proceedings of the 29th conference on Information communications, Mar. 14, 2010, 9 pp.

Tsai et al., "A Flexible Wildcard-Pattern Matching Accelerator via Simultaneous Discrete Finite Automata," IEEE Transactions on Very Large Scale Integration (VLSI) Systems, vol. 25, No. 12, Dec. 2017, pp. 3302-3316.

* cited by examiner

```
/* Constants */

CONSTANTS:
    ETHERTYPE_VLAN: '0x8100'
    ETHERTYPE_IPV4: '0x0800'
    DEFAULT: ['0x0', '0x0']

HDR_TYPE:
  Eth:
      dst_addr: 48
      src_addr: 48
      type: 12
  vlan:
      pc_vid: 16
      type: 16
  ip_v4:
      v4_other: 96
      src: 32
      dst: 32

HDR_INSTANCE:
  eth: [eth0]
  vlan: [vlan0]
  ip_v4: [v4]

BUS:
  -
      Name: prv_fv
      Width: 8
      Size: 104 prv_fv:
    v4_src: {0: 4}
    v4_dst: {4: 4}

START_STATE:
    0x**: parse_ethernet // Assuming 8-bit ingress port

START_KEY:
    parse_ethernet: [eth0.type.0, eth0.type.1]

END_STATE:
    END: 255

/* Parse Graph specification */
parse_ethernet: |
    ETHERTYPE_IPV4:
        SHIFT v4.src
        GOTO parse_v4
    ETHERTYPE_VLAN:
        SHIFT vlan0.pc_vid
        SET_KEY vlan0.type.0, vlan0.type.1
        GOTO parse_vlan
    DEFAULT:
        GOTO END parse_vlan: |
    ETHERTYPE_IPV4:
        SHIFT v4.src
        GOTO parse_v4
    DEFAULT:
        GOTO END parse_v4: |
    DEFAULT:
        MV prv_fv.v4_src, v4.src
        MV prv_fv.v4_dst, v4.dst
        Goto END

END: |
    NOP
```

FIG. 5

PIPELINE USING MATCH-ACTION BLOCKS

CROSS REFERENCE

This application claims the benefit of U.S. Provisional Patent Application No. 62/911,082 filed on Oct. 4, 2019, which is hereby incorporated by reference herein in its entirety.

TECHNICAL FIELD

This disclosure relates to data processing, and more specifically, to use of data stored within one or more hardware devices to represent and traverse directed graphs.

BACKGROUND

A directed graph generally consists of a set of vertices (or nodes) and a set of directional edges connecting the vertices. The edges correspond to transitions from one vertex to the next. Often, directed graphs can be used to represent finite state diagrams having an initial state and a number of intermediate states corresponding to processing steps. Directed graphs are well understood data structures with applications in many fields, including computer networking and stream processing.

SUMMARY

This disclosure describes techniques that include representing, traversing, and processing directed graphs using one or more content-addressable memory devices. Further, aspects of one or more systems and/or techniques described herein include logic configured to operate on operands from multiple locations, including data extracted from bus locations (e.g., source/destination) and/or accessed within one or more storage devices. In this way, rather than relying on separate instructions for each combination of operands (e.g., flags or nibbles) for data (e.g., a packet), a system may account for operands by receiving the operands from an output bus.

Techniques in accordance with one or more aspects of the present disclosure may provide several advantages. For instance, techniques in accordance with one or more aspects of the present disclosure may reduce a number of basic operation instructions to achieve a given action compared to systems that are not configured to account for operands. Further, the techniques may improve an ability to control the actual updates being performed through action arguments as a flag block and/or improve efficiencies in a minimization of number of such action blocks necessary as choices per-table for a runtime software. In some examples, such techniques may simplify a table flow graph due to efficiencies arising from minimization of number of tables.

In one example, this disclosure describes an apparatus comprising: an output bus; a match table configured to store a plurality of entries, each entry of the plurality of entries including a key value, wherein the match table specifies a matching entry in response to being queried by query data received from the output bus; one or more storage devices configured to store operation information for each of the plurality of entries stored in the match table, wherein the operation information specifies one or more instructions associated with each respective entry in the plurality of entries stored in the match table; and logic connected to the output bus, the match table, and the one or more storage devices, wherein the logic is configured to: receive one or more operands from the output bus; identify one or more instructions in the one or more storage devices; and generate, based on the one or more instructions and the one or more operands, processed data.

In another example, this disclosure describes a method comprising: generating, by a match table, an index for operation information specifying one or more operations for a matching entry stored in the match table; identifying, by logic implemented in circuitry and based on the index, one or more instructions in one or more storage devices; receiving, by the logic, one or more operands from the output bus; generating, by the logic, processed data based on the one or more instructions and the one or more operands.

In another example, this disclosure describes apparatus comprising: ternary content-addressable memory (TCAM) configured to store a plurality of entries, each entry of the plurality of entries including a key value, wherein the TCAM specifies a matching entry in response to being queried by query data received from an output bus; one or more storage devices configured to store operation information for each of the plurality of entries stored in the TCAM, wherein the operation information specifies one or more instructions associated with each respective entry in the plurality of entries stored in the TCAM; and logic connected to the output bus, the TCAM, and the one or more storage devices, wherein the logic is configured to: receive one or more operands from the output bus; identify one or more instructions from the one or more storage devices; and generate, based on the one or more instructions and the one or more operands, processed data.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

FIG. 5 is a conceptual illustration of an example pseudo-code listing that may perform a traversal of a directed graph for parsing network headers, in accordance with one or more aspects of the present disclosure.

DETAILED DESCRIPTION

Content-addressable memory (CAM) devices operate by accepting an input query value, and then performing a search of the data stored within the content-addressable memory to identify a storage address or location (or "entry") within the memory having data that matches the query value. CAM might be considered, in some respects, to be the opposite of random access memory (RAM), because for a RAM device, an address is input to the RAM device, and the RAM device returns the data at that address. With a CAM device, on the other hand, data is presented to the CAM device as input, and the CAM device returns the address of one or more storage locations that match the input data. In some examples, a CAM device returns the first address or entry number that matches the data included in the query. In other examples, a CAM device may return multiple addresses if multiple addresses or entries within the CAM device match the query data. Further, some content-addressable memory devices perform the query through a parallel search of multiple entries, and as a result, content-addressable memory device may be significantly faster than random access memory devices.

A "ternary" content-addressable memory (TCAM) device differs from a CAM device because a TCAM device enables queries to be performed using a mask value for each of the entries in the TCAM, thereby effectively enabling three different values (0, 1, and a "don't care" value) for each bit stored within a TCAM storage. For example, if a bit in a TCAM entry is a "don't care" value (referred to herein as an "X" value), the TCAM considers either a "0" or "1" input value presented as a search query to match that "X" value, thereby effectively broadening the search query. This differs from a search performed by a binary CAM device, which performs exact-match searches using only 0s and 1s. While examples described herein are directed to CAM, and more specifically, to TCAM, techniques described herein for operands from an output bus may be used for other types of data, such as, but not limited to, for example, a Hashtable, a direct index, and other data.

Figure 1A:
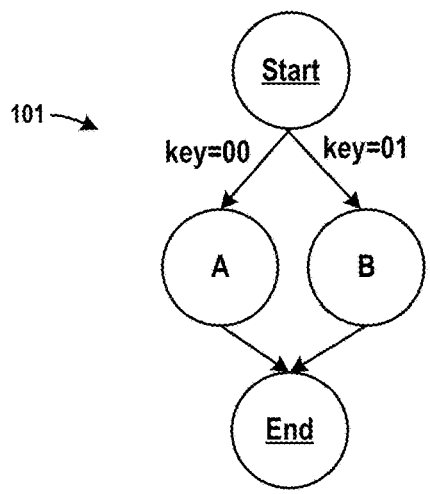
FIG. 1A is a conceptual diagram illustrating a simple directed graph, in accordance with one or more aspects of the present disclosure.

FIG. 1A is a conceptual diagram illustrating a simple directed graph, in accordance with one or more aspects of the present disclosure. In FIG. 1A, directed graph 101 represents a set of four nodes (or "vertices") including a "Start" node, "A" and "B" nodes, and an "End" node. Directed graph 101 further includes a number of "directed edges" which represent transitions from one node to the next. From the Start state, for example, directed graph 101 transitions to the A node if an input value (e.g., the "key" value) is 00, and to the B node if the input value is 01. The transition from either the A or B node is to the End state, regardless of the value of the key or any input.

Figure 1B:
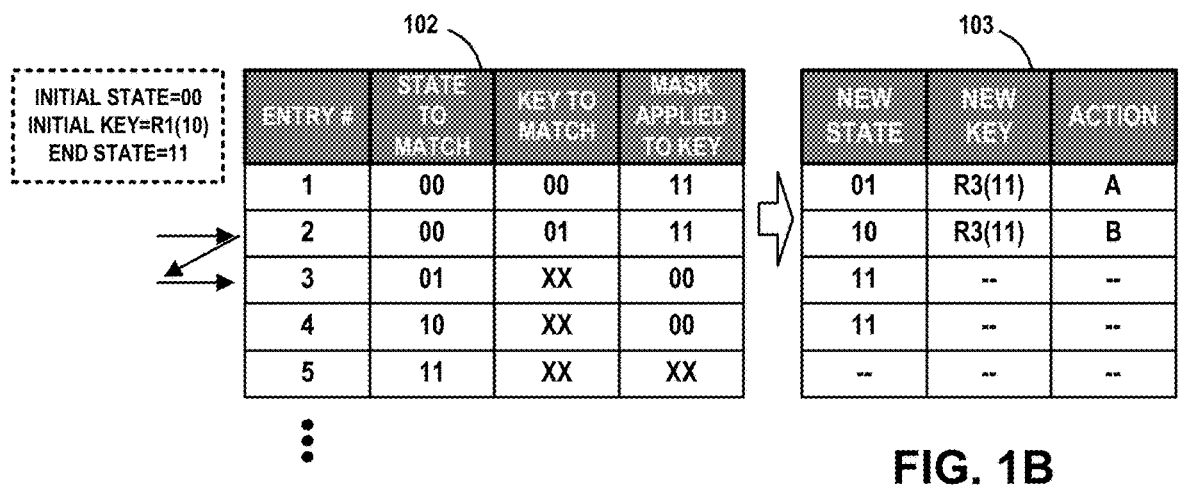
FIG. 1B is a table illustrating data that may be stored in example TCAM for traversing the directed graph of FIG. 1A, in accordance with one or more aspects of the present disclosure.

FIG. 1B is a table illustrating data that may be stored in example TCAM for traversing the directed graph of FIG. 1A, in accordance with one or more aspects of the present disclosure. TCAM table representation 102 of FIG. 1B illustrates bitwise data stored within a TCAM having many entries (five are shown in FIG. 1B), each of which includes a two-bit state value, a two-bit key value, and a two-bit mask value. Operations table 103 illustrates data, organized by TCAM entry, that may be stored within the TCAM or in a separate storage device that has entries that correspond to each of the TCAM entries.

Figure 1C:
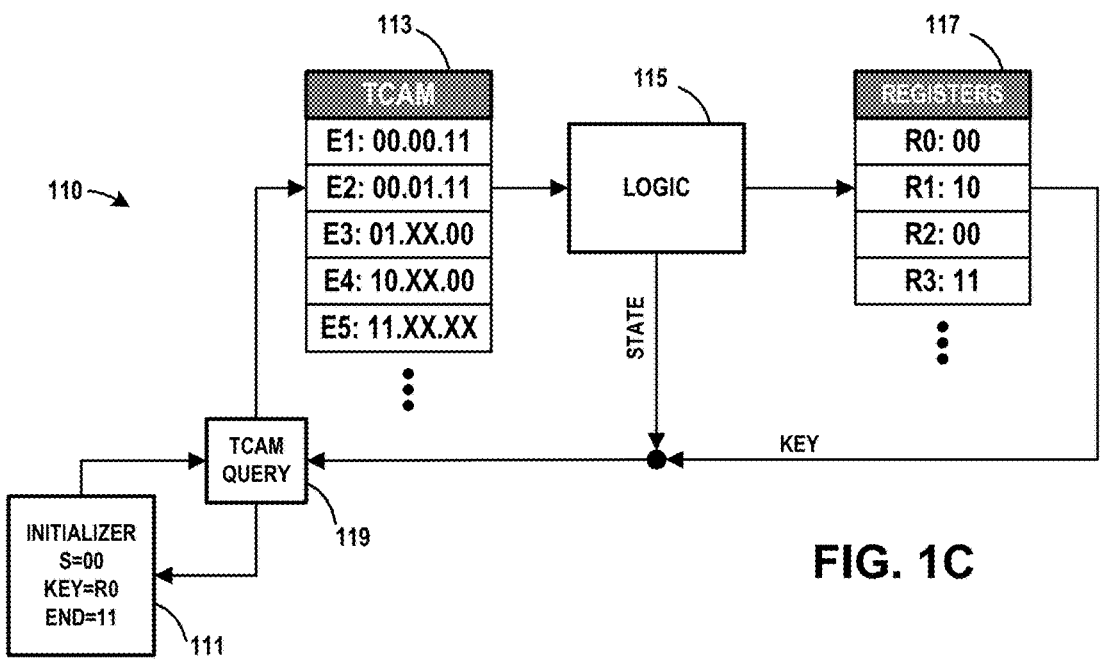
FIG. 1C is a conceptual diagram illustrating hardware devices and/or modules used to implement and traverse the directed graph of FIG. 1A, in accordance with one or more aspects of the present disclosure.

FIG. 1C is a conceptual diagram illustrating hardware devices and/or modules used to implement and traverse the directed graph of FIG. 1A, in accordance with one or more aspects of the present disclosure. In various examples, system 110 may be implemented as one or more application-specific integrated circuit (ASIC) components or as other hardware and software components. System 110 may, for example, represent a portion of a data processing unit (DPU), or devices including a DPU, for processing streams of information, such as network packets or storage packets. In general, a stream is defined as an ordered, unidirectional sequence of computational objects that can be of unbounded or undetermined length. In a simple example, a stream originates in a producer and terminates at a consumer, is operated on sequentially, and is flow-controlled. In some examples, a stream can be defined as a sequence of stream fragments, each representing a portion of data communicated by a stream. Streams can be discrete, such as a sequence of packets received from a network, or continuous, such as a stream of bytes read from a storage device. Additional example details of various example access nodes are described in U.S. Provisional Patent Application No. 62/559,021, filed Sep. 15, 2017, entitled "Access Node for Data Centers," and U.S. Provisional Patent Application No. 62/530,691, filed Jul. 10, 2017, entitled "Data Processing Unit for Computing Devices," the entire contents of both being incorporated herein by reference In this example, system 110 of FIG. 1C includes one or more TCAM devices 113, one or more logic devices 115, and one or more register arrays 117. TCAM 113 may include data corresponding to the entries illustrated in TCAM table representation 102 of FIG. 1B, so in the example shown, TCAM 113 includes entries that are 6 bits wide: the first 2 bits corresponding to the state value, the middle 2 bits corresponding to the key value, and the rightmost 2 bits corresponding to a mask value. Data stored within 113 thereby corresponds to five entries with the same sequence of six bits that are illustrated in TCAM table representation 102.

A logical "and" operation using the mask is applied to the key values when TCAM 113 performs a query on input provided by TCAM query module 119. In other words, when a query is presented to TCAM 113, the two-bit mask is applied to that portion of the input query that corresponds to the key, and further, the same two-bit mask is applied to that portion of each entry in TCAM 113 that corresponds to the key (e.g., the middle two bits of each entry in TCAM 113). Therefore, when the mask value for a given TCAM entry is "00," the key value portion of any query will match the key portion of each of entries within TCAM 113, since the key value bits for the query and for each TCAM entry will, after a logical "AND" masking operation, be "00."

Logic 115 may be used to perform sequencing operations (e.g., determine a new state value) or perform other actions, such as writing data to locations within register array 117 or elsewhere. In some examples, logic 115 of FIG. 1C may be configured to perform one or more techniques for operands from an output bus (see one or more logic devices 416 of FIG. 7). Register array 117 may correspond to an array of registers, each including data consistent with that shown in operations table 103 and used in the manner hereinafter described. System 110 further includes initialization module 111 and TCAM query module 119. Initialization module 111 may include initial system variables, such as an in initial state, initial key value (or a reference to a register that holds the initial key value), and an identification of an "END" state. TCAM query module 119 receives input from logic 115, register array 117, and/or initialization module 111 to generate a query presented as input to TCAM 113. TCAM query module 119 may also interact with initialization module 111 to update one or more initial system variables and/or to evaluate and/or output data received by TCAM query module 119.

In FIG. 1C, and in accordance with one or more aspects of the present disclosure, system 110 may begin traversing directed graph 101 at an initial state. For instance, in the example of FIG. 1C, TCAM query module 119 determines, based on input from initialization module 111, that the initial state value for system 110 is the two-bit quantity "00" (i.e., "S=00") and the initial key value is "00" (also a two-bit quantity, stored in R0), also specified by initialization module 111. Further, initialization module 111 also specifies that traversing the directed graph will terminate when a state value corresponding to the two-bit quantity "11" is encountered.

System 110 may process a first query after the initial state is initialized. For instance, on the first clock cycle in FIG. 1C, TCAM query module 119 generates a query of "0000," composed of the initial state value (two-bit quantity 00) and the initial key value (the two-bit quantity stored in R0 of register array 117). TCAM query module 119 presents the "0000" query to TCAM 113. TCAM 113 matches the first entry ("E1") because searching the entries in ascending order, starting from E1, results in a match of E1. In this first query, the two rightmost bits (corresponding to the key value) of the query value of "0000" are masked using the "11" masking bits in the first entry (E1), and the middle two bits of the first entry (corresponding to the key value in E1) are also masked using the "11" masking bits in the first entry. In this case, after the masking operation, the query matches the first four bits of the first entry, so TCAM 113 determines that the query matches the first entry. (In this case, since the masking bits are "11," the masking operation has no effect on the key values, and the query matches the first entry even without the masking operation.).

System 110 may perform, based on the results of the query matching E1, sequencing operations and one or more actions associated with E1. For instance, in FIG. 1C, logic 115 receives input from TCAM 113 identifying matching entry 1 (E1). Logic 115 determines, based on the matching entry #1 and data corresponding to that of operations table 103, that the next state value is "01" (see the row corresponding to matching entry #1 in operations table 103 of FIG. 1B). Logic 115 further determines that the new key is the value stored in R3 (which, in this example, is the two-bit quantity "11"). Still further, logic 115 performs one or more actions corresponding to node "A." In some examples, such actions may include modifying a stored value, writing data to one or more storage locations, or another operation.

System 110 may perform a second query. For instance, still referring to FIG. 1C, and on the second clock cycle, TCAM query module 119 generates a new query of "0111," which is generated based on the new state value "01" (resulting from prior query matching E1) and the new key value ("11" stored in R3). TCAM query module 119 presents the new query to TCAM 113, and TCAM 113 determines that entry 3 (corresponding to E3 in TCAM 113) is the first match. Entry 3 matches since the query state value (01) matches the state value of entry 3, and the mask of entry 3 (00) effectively masks out all values of the key, so that any key value will match the key value of entry 3.

System 110 may terminate based on the results of the second query. For instance, in FIG. 1C, logic 115 receives input from TCAM 113 identifying matching entry 3. Logic 115 determines, based on this input and data corresponding to that of operations table 103, that the next state is 11, which is the "END" state. Since logic 115 has determined that the end state has been encountered, the next value of the key is immaterial, so in some examples, no register is specified in operations table 103 in the row corresponding to entry 3. Logic 115 and/or TCAM query module 119 terminate the traversal of directed graph 101 pursuant to encountering the "END" state.

Note that in the example of FIG. 1C, if the initial key were "01," TCAM 113 would initially identify entry 2 as the matching entry. In such an example, logic 115 would receive input identifying entry 2 as the matching entry on the first clock cycle. Based on this input and the data stored in operations table 103, logic 115 would perform action B (corresponding to node B of directed graph 101) before transitioning to state "10" and then to state "11," and then terminating. Accordingly, system 110 corresponds to a traversal of the directed graph corresponding to directed graph 101.

Figure 2A:
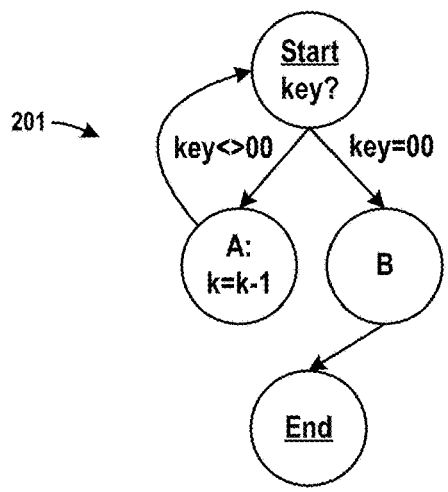
FIG. 2A is a conceptual diagram illustrating another directed graph, in accordance with one or more aspects of the present disclosure.

FIG. 2A is a conceptual diagram illustrating another directed graph, in accordance with one or more aspects of the present disclosure. In FIG. 2A, directed graph 201 represents a set of four vertices or nodes including a "Start" node, "A" and "B" nodes, and an "End" node. In the example of FIG. 2A, node A involves decrementing the key ("k") value, and returning to the Start node. This loop continues until the key value reaches 0, at which point the Start node transitions to node B, followed by a transition to the End node.

Figure 2B:
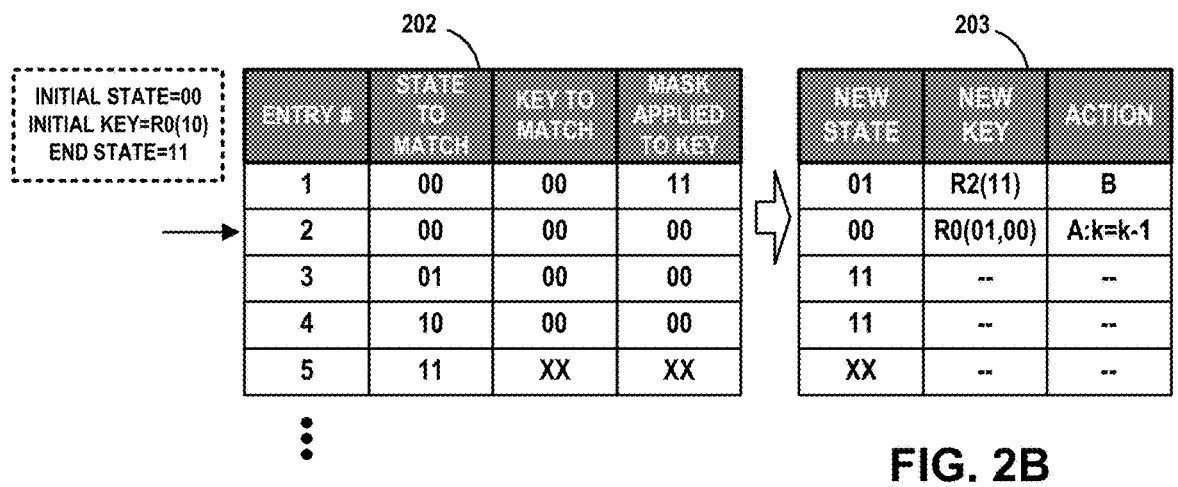
FIG. 2B is a table illustrating data that may be stored in example TCAM and storage devices corresponding to the directed graph of FIG. 2A, in accordance with one or more aspects of the present disclosure.

FIG. 2B is a table illustrating data that may be stored in example TCAM and storage devices corresponding to the directed graph of FIG. 2A, in accordance with one or more aspects of the present disclosure. TCAM table representation 202 of FIG. 2B, like TCAM table representation 102 of FIG. 1B, illustrates bitwise data stored within a TCAM having a number of entries, each of which includes a two-bit state value, a two-bit key value, and a two-bit mask value. Operations table 203 illustrates data used by logic 115 to traverse directed graph 201. The data in operations table 203 is organized by TCAM entry. As in FIG. 1B, the data in operations table 203 may be stored within the TCAM or in a separate storage device.

Figure 2C:
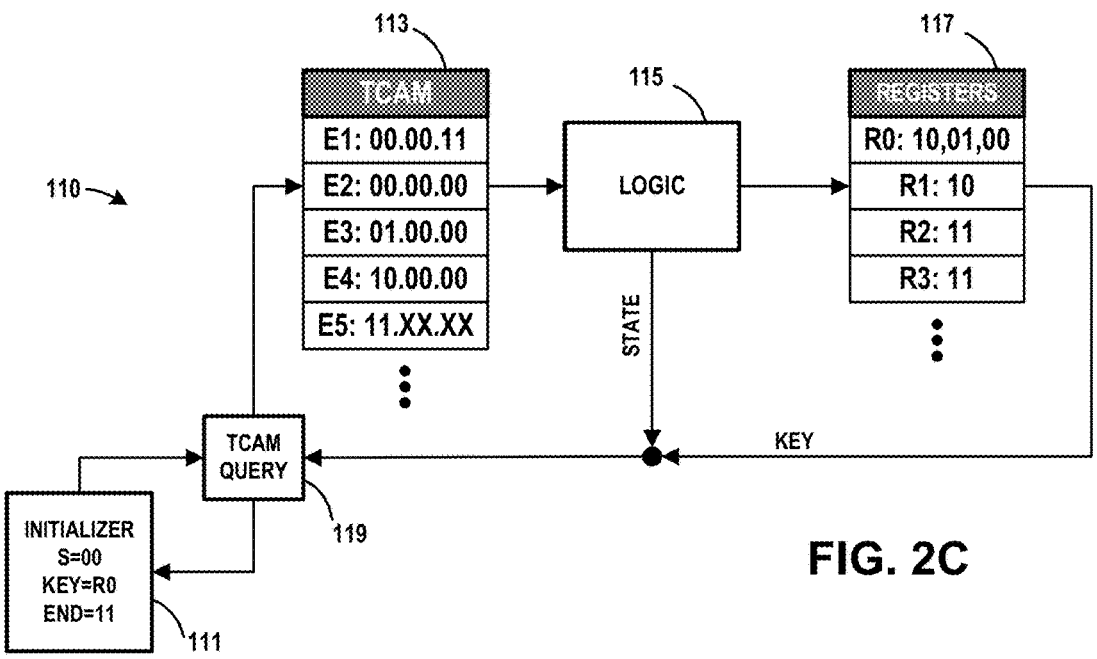
FIG. 2C is a conceptual diagram illustrating hardware devices and/or modules used to implement and traverse the directed graph of FIG. 2A, in accordance with one or more aspects of the present disclosure.

FIG. 2C is a conceptual diagram illustrating hardware devices and/or modules used to implement and traverse the directed graph of FIG. 2A, in accordance with one or more aspects of the present disclosure. System 110 of FIG. 2C is the same as the system illustrated in FIG. 1C, except that the data in TCAM 113 and register array 117 has been modified to correspond to directed graph 201 of FIG. 2A, rather than directed graph 101 of FIG. 1A. Accordingly, each of the components or devices within FIG. 2C may correspond to like-numbered components or devices of FIG. 1C, and descriptions provided in connection with FIG. 1C may apply to components and/or devices of FIG. 2C.

In FIG. 2C, and in accordance with one or more aspects of the present disclosure, system 110 may begin traversing directed graph 201 at an initial state. For instance, in the example of FIG. 2C, TCAM query module 119 determines, based on input from initialization module 111, that the initial state value for system 110 is the two-bit quantity "00," and the initial key value is "10" (also a two-bit quantity, and corresponding to the value initially stored in R0). Further, initialization module 111 also specifies that traversing the directed graph will terminate when a state value corresponding to the two-bit quantity "11" is encountered.

System 110 may process a first query after initialization. For instance, on the first clock cycle in FIG. 2C, TCAM query module 119 generates a query of "0010," composed of the initial state value (two-bit quantity 00, as specified by initialization module 111) and the initial key value (the two-bit quantity "10" initially stored in R0 of register array 117). TCAM query module 119 presents the "0010" query to TCAM 113. TCAM 113 traverses each of its entries in sequential order, and does not match the first entry ("E1"), but matches the second entry ("E2"). Upon matching the second entry, TCAM 113 outputs to logic 115 information about the second entry. TCAM 113 does not match the first entry because while the state value matches the query state value (00), the key value of entry 1 (00) does not match the key value of the query (10). The mask value in entry one (the mask value is "11") will not have any effect on the value of the query key or the key portion of the data stored in E1. Accordingly, TCAM 113 does not match entry 1, and therefore proceeds, sequentially, to entry 2. TCAM 113 determines that entry 2 is a match because the state value matches (both the query and E2 have state values of "00"), and the key value of entry 2 will match any queried key value, since entry 2 applies (i.e., through a logical "AND") a "00" mask to both the query key and the entry key, ensuring that both compared values are equal to "00."

System 110 may decrement the value of the key as a result of matching entry 2. For instance, in FIG. 2C, logic 115 receives input from TCAM 113 identifying matching entry 2. Logic 115 determines, based on the matching entry 2 and data corresponding to that of operations table 203, that the next state value is "00" (see the row of operations table 203 of FIG. 2B corresponding to entry 2). Logic 115 further determines that the new key is the value stored in R0. In some examples, logic 115 of FIG. 2C may be configured to perform one or more techniques for operands from an output bus (see one or more logic devices 416 of FIG. 7). In this example, logic 115 also performs one or more actions corresponding to node A (as specified in operations table 203), which in this example, involves decrementing the contents of the key value, stored in R0. Accordingly, the new key is "01" (the initial value of "10" stored in R0 after subtracting 1).

System 110 may continue to decrement the value of the key. For instance, still referring to FIG. 2C, and on the second clock cycle, TCAM query module 119 generates a new query of "0001," which is generated based on the state value of "00" and the new key value ("01"). TCAM query module 119 presents the new query to TCAM 113, and TCAM 113 determines that entry 2 is again the first matching entry. TCAM 113 outputs to logic 115 information about entry 2. Logic 115 determines, based on input from TCAM 113 and data corresponding to that of operations table 203, that the next state continues to be "00." Logic 115 also decrements the value of the key stored in R0, just as it did in the prior clock cycle, resulting in the new key value of "00."

System 110 may exit the loop and transition to node B. For instance, again referring to FIG. 2C, and on the third clock cycle, TCAM query module 119 generates a new query of "0000," and presents it to TCAM 113. This time, TCAM 113 matches entry 1, and outputs information identifying entry 1 to logic 115. Logic 115 detects the input and performs, based on the data stored in operations table 203 of FIG. 2B, sequencing and action operations. Specifically, logic 115 determines that the new state is "11" (the value stored in R2), and performs one or more actions corresponding to node B. Logic 115 outputs information about the state to TCAM query module 119. TCAM query module 119 determines that the state value matches the end state value, and therefore terminates, thereby completing the traversal of directed graph 201.

Processing network packets, or network packet headers in an incoming byte stream, is one application that may be suitable for a TCAM-based system, such as that illustrated in FIG. 1C and FIG. 2C, that parses a directed graph. Parsing network packet headers may involve examining fields within various types of headers and processing packets based on the data stored within the fields. Packets typically contain multiple headers, each carrying information about protocols or information about how the packets should be handled, processed, and/or routed. Normally, each header is parsed in sequence, and the process for doing so can often be represented by a directed graph. Traversal of such a directed graph, using techniques described herein, may result in effective parsing of network headers.

Figure 3:
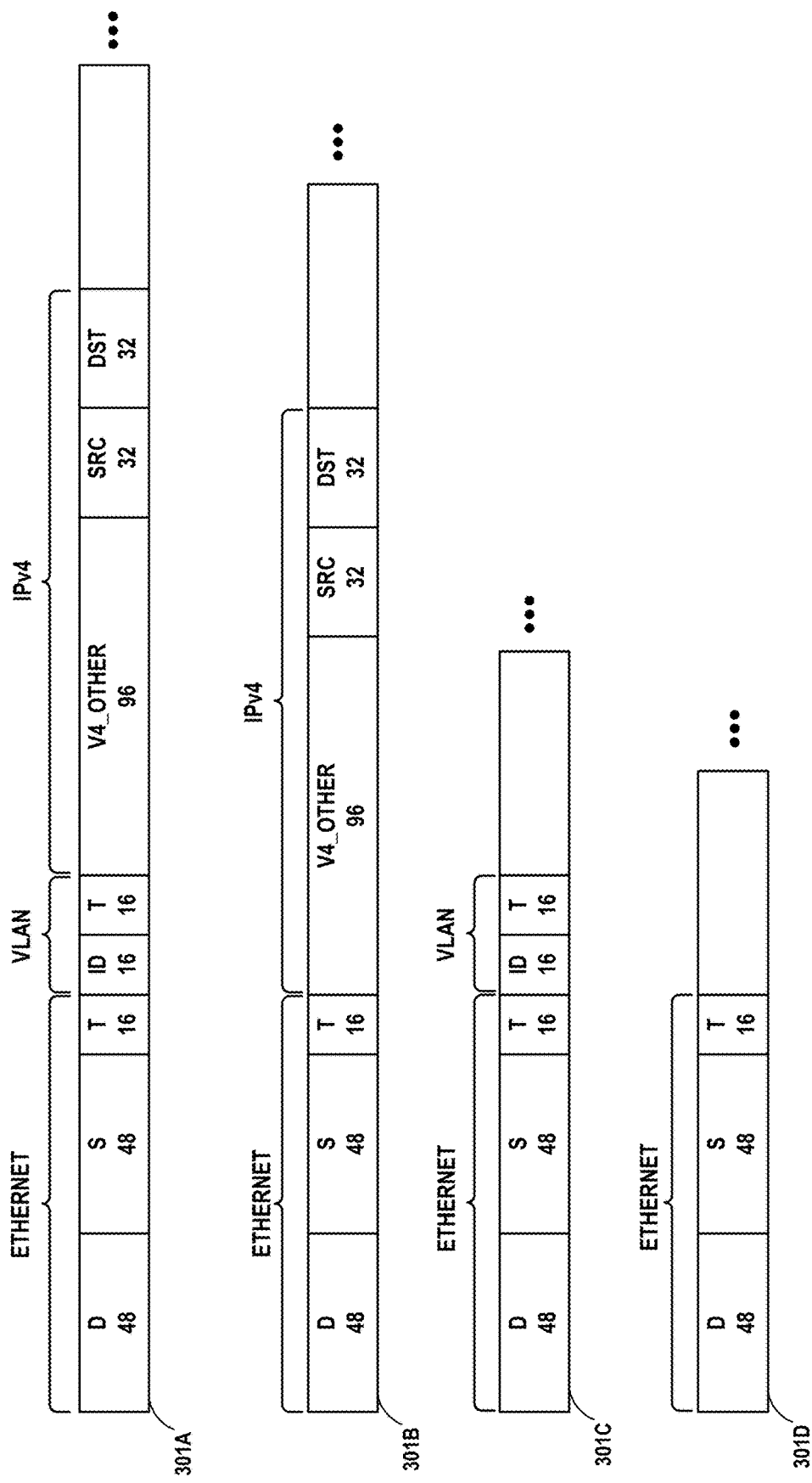
FIG. 3 is an illustration of four example data streams that may be parsed in accordance with one or more aspects of the present disclosure.

FIG. 3 is an illustration of four-byte streams that may be parsed in accordance with one or more aspects of the present disclosure. The example of FIG. 3 includes header formats 301A through 301D, each differing in the packet headers included within each stream. Header format 301A of FIG. 3 includes an Ethernet header followed by a virtual local area network (VLAN) header, and then followed by an IP v4 header. The Ethernet headers illustrated in FIG. 3 includes a 48-bit destination address, a 48-bit source address, and a 16-bit type identifier. The VLAN header in header format 301A includes a 16-bit "PC_VID" field, and a 16-bit type field. The IP v4 header of header format 301A includes a 96-bit sequence of fields ("V4 Other"), a 32-bit source address, and a 32-bit destination address.

Header format 301B has a format similar to header format 301A, except that header format 301B includes an Ethernet header followed by the IP v4 header (i.e., omitting the VLAN header present in header format 301A). Header format 301C includes an Ethernet header followed by the VLAN header, without the IP v4 header. And as shown in FIG. 3, header format 301D includes only an Ethernet header.

Parsing logic for parsing each of header formats 301A through 301D can be represented through a directed graph, with states at least partially devoted to parsing each type of header, and with transitions to new states that may be specific to each header. Where parsing logic can be represented as a directed graph, network headers (e.g., header formats 301A through 301D) may be parsed through a TCAM-based parser in a manner consistent with the description of directed graph traversals described in connection with FIG. 1C and FIG. 2C. In some examples, an appropriate packet header parser may be constructed by making some modifications to system 110 of FIG. 1C and FIG. 2C.

Figure 4:
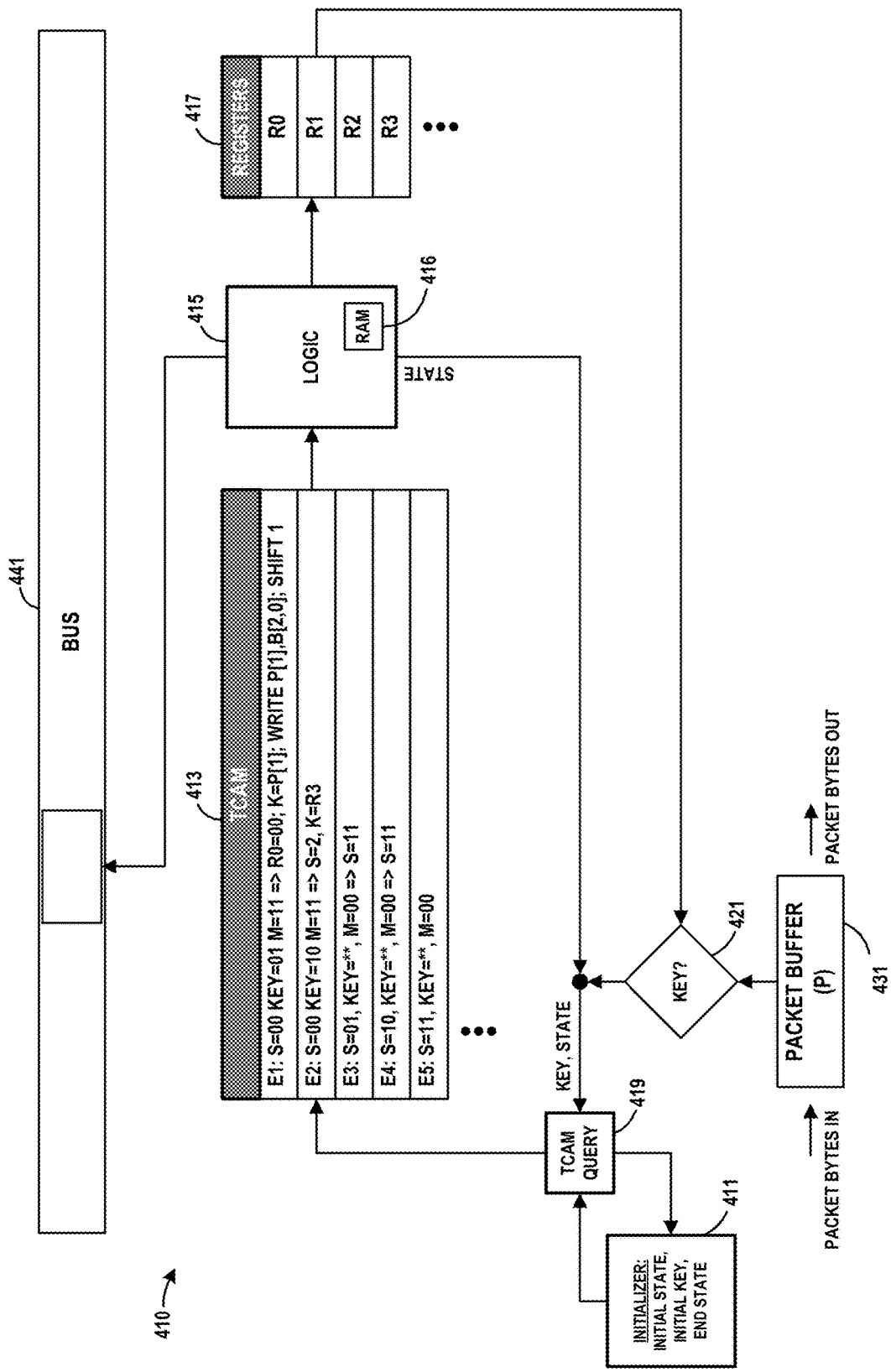
FIG. 4 is a conceptual diagram illustrating hardware devices and/or modules used to implement and traverse an example network header, in accordance with one or more aspects of the present disclosure.

FIG. 4 is a conceptual diagram illustrating hardware devices and/or modules used to implement and traverse an example network header parser, in accordance with one or more aspects of the present disclosure. Packet parsing system 410 of FIG. 4 includes one or more TCAM devices 413, one or more logic devices 415, and one or more register arrays 417, one or more initialization modules 411, one or more TCAM query modules 419, one or more key selectors 421. In some examples, packet parsing system 410 further includes packet buffer 431 and/or output bus 441.

Initialization module 411 may initialize a value for an initial state and an initial key, and define an end state. Key selector 421 selects and/or extracts data from packet buffer 431, and selectively identifies a key value from either packet buffer 431 or one or more registers in register array 417.

Packet buffer 431 receives a sequence of bytes from a packet stream (e.g., over a network connection) and may output bytes after parsing by packet parsing system 410. TCAM query module 419 accepts input from key selector 421 and/or logic 415 and prepares a query to present to TCAM 413. Logic 415 may write data to output bus 441, and cause register array 417 to output a value to TCAM query module 419.

Logic 415 may further store values extracted from packet buffer 431 to RAM 416 (included within logic 415) or to one or more registers in register array 417 for possible later use (e.g., as values included within a query presented to TCAM 413 by TCAM query module 419). Accordingly, logic 415 may store any data into register array 417, and not merely data extracted from a packet header or from the byte stream. Accordingly, keys may be based on data from packet buffer 431, in addition to data from register array 417 or other storage locations (e.g., RAM 416). In some examples, logic 415 of FIG. 4 may be configured to perform one or more techniques for operands from an output bus (see one or more logic devices 416 of FIG. 7).

In some examples, logic 415 may also be capable of performing arithmetic operations on data stored within RAM 416, within register array 417, or within other locations. Such operations may, for example, be performed by a VLIW (Very Large Instruction Word) processor included within logic 415. Alternatively or in addition, logic 415 (or packet parsing system 410 generally) may operate as a micro-coded action processor using a TCAM-based implementation.

Logic 415 may also be configured to cause packet buffer 431 to shift bytes out of packet buffer 431, discarding bytes that are not used or are no longer needed, and thereby advancing into packet buffer 431 new bytes for processing. Still further, logic 415 may write data to output bus 441 when performing actions corresponding to nodes in a directed graph. In this way, output bus 441 may be used for storing useful packet data extracted from packet bytes passing through packet buffer 431, thereby applying a structure to the incoming byte stream arriving over a network connection. Logic 415 may include RAM 416 for use in storing data accessed, generated, and/or extracted during processing.

For ease of illustration, a limited number of TCAM devices 413, logic devices 415, register arrays 417, TCAM query modules 419, key selectors 421, output buses 441, packet buffers 431, and other components, devices, and structures are shown within FIG. 4 and/or in other illustrations referenced herein. However, techniques in accordance with one or more aspects of the present disclosure may be performed with many more of such systems, and collective references to components, devices, modules, and/or systems may represent any number of such components, devices, modules, and/or systems. For instance, multiple packet parsing systems 410 may operate in parallel, and to increase throughput of parsing operations. In some examples, each of packet parsing systems 410 may share one or more components (e.g., packet parsing system 410), and in addition, may share state information to streamline operations.

In FIG. 4, and in accordance with one or more aspects of the present disclosure, packet parsing system 410 may begin traversing a directed graph at an initial state. For instance, in the example of FIG. 4, TCAM query module 419 determines, based on input from initialization module 411, an initial state, an initial key, and an end state. On the first clock cycle in FIG. 4, TCAM query module 419 generates a query based on the initial state and key, and presents the query to TCAM 413. TCAM 413 identifies a matching entry and outputs information about the matching entry to logic 415.

Logic 415 determines, based on the input (i.e., entry #) received from TCAM 413, one or more sequencing operations and one or more action operations to perform. For instance, in the example of FIG. 4, if entry 1 is the matching entry based on its state ("S=00" for E1 in FIG. 4), key ("KEY=01" for E1), and mask ("M=11" for E1) values logic, 415 determines, based on matching entry 1, that the operations following the "=>" are to be performed. Logic 415 may receive information identifying these operations from TCAM 413, or logic 415 may use the identity of the matching entry output by TCAM 413 (in this case, entry 1) to identify the operations by accessing information within RAM 416, register array 417, or other storage. For entry 1, logic 415 performs a number of operations, including writing a value of "00" to R0 ("R0=00"), assigning byte index 1 from packet buffer 431 to the key value ("K=P[1]"), writing data starting at byte index 1 from packet buffer 431 to bytes 2, 1, and 0 of output bus 441 ("WRITE P[1], B[2,0]"), and shifting 1 byte out of packet buffer 431 ("SHIFT 1").

Packet parsing system 410 may continue to process additional queries and traverse a directed graph for parsing packet headers. For instance, still referring to FIG. 4, logic 415 outputs state information to TCAM query module 419. TCAM query module 419 determines, based on the state information and/or information from key selector 421, a new query. TCAM query module 419 presents a new query to TCAM 413. TCAM 413 outputs a matching entry index to logic 415. Logic 415 again performs sequencing operations and action operations based on the matching entry index received from TCAM 413. In some examples, the sequencing operations may involve determining a new state value based on information stored in one or more registers and/or other storage locations. In some examples, the action operations may involve performing modifications to values stored in register array 417 or other storage locations, moving data from packet buffer 431 into output bus 441, shifting bits out of packet buffer 431, or other operations. Packet parsing system 410 continues to process a new state and perform action operations until an end state is reached.

Through appropriate entries in TCAM 413 and, in some examples, within RAM 416 and register array 417, packet parsing system 410 may traverse a directed graph for parsing the network headers illustrated in FIG. 3. One such example directed graph, expressed in the form of pseudocode, is illustrated in FIG. 5.

FIG. 5 is a conceptual illustration of an example pseudocode listing that may perform a traversal of a directed graph for parsing network headers (traversing a "parse graph"), in accordance with one or more aspects of the present disclosure. The pseudocode of FIG. 5 corresponds to an idealized parsing process performed by packet parsing system 410 of FIG. 4 to process header formats 301A through 301D as illustrated in FIG. 3. In the example of FIG. 5, it is assumed that header formats 301A through 301D of FIG. 3 are the only stream types that are to be processed. Other or additional packet and/or stream types can be parsed with appropriate modifications to the code listed in FIG. 5.

The code listing of FIG. 5 relies on a number of syntax and language constructs or assumptions in order to unambiguously and accurately express a parse graph and appropriate operations performed in connection with traversing the parse graph. In some examples, an existing and well-supported markup or data serialization language, such as YAML (sometimes described as an acronym for "YAML Ain't Markup Language"), might be used to express code corresponding to functions and/or operations to be performed by a system. Using an existing language may enable beneficial leveraging of existing documentation as well as interpretive, parsing, and/or processing tools. In other examples, new and/or customized language and/or language constructs might be conceived for expressing a directed graph and the traversal of the directed graph.

To express directed graphs and traversal of directed graphs using source code, an ability to express the following a number of language constructs may be helpful. For example, it may be useful to express addressing mechanisms for bus locations, packet header layouts and instances, conditionals that can be mapped into TCAM lookup keys, and packet buffer byte shifts as a function of the destination field offset in a packet instance.

To enable use of labels in a program listing, a language construct enabling expression of integer constants may be expressed with a form such as the following:
DEF_PKT_LEN: 64

String constants may be used where string constants are expected (e.g., as labels) through the following:
ETHERTYPE_VLAN: '0x8100'

Lookup key constants may be expressed using a notation that specifies both a value and a mask, or a set of "don't cares" for certain nibbles and/or bits:
VAR_ONE: 0x**24//first two nibbles are don't care
VAR_TWO: 0B* * * * * * *1//first 7 bits are don't care
VAR_THREE: ['0x01', '0x03']//interpreted as value, mask Variables or data fields on the bus (e.g., the parsed result vector bus) can be expressed based on a location within that bus. Since there may be multiple buses referenced in a single program, a name field, as used below, may be used to identify the bus being referenced:
BUS:
Name: prv_fv
Width: 8
Size: 104
Name: meta_fv
Width: 4
size: 96
Name: pry flags
Width: 1
Size: 32

Each variable on a given bus might be expressed in source code by identifying an offset and width value. In the example below, each variable is referenced by the notation "{x,w}", where "x" is the offset or byte location on the bus, and "w" is the width or size of that variable, in bits, on the bus:

PRV_FV:
v4_src: {0, 4}
v4_dst: {4, 4}

A stream of bits might be interpreted as a structured packet header, if a language construct is used to define the format or structure of each header. In the following example, a structure for Ethernet ("Eth"), VLAN, and IP v4 packet is defined using the "hdr_type" label:
hdr_type:
Eth:
dst_addr: 48
src_addr: 48
type: 12
vlan:
pc_vid: 16
type: 16
ip_v4:
v4_other: 96
src: 32
dst: 32

The same types of packet headers can appear multiple times in a stream, so in some examples, each instance can be referenced separately (and distinctively) using the following notation:
hdr_instance:
eth: [eth0]
vlan: [vlan 0]
ip_v4: [v4]

Source code instructions may, in some examples, tend to fall into one of two categories: instructions that involve traversing the parse graph (sequencing instructions), and instructions that involve bus accesses, including as storing and/or saving data on the parsed result vector (action instructions). The following instructions are examples of instructions that might be considered sequencing instructions, and they might be expressed using the following format:
GOTO <node>://Unconditional transition to a node
SET_KEY [<end_fld., start_fld>|<end_reg, start_reg>]//
The above line sets the lookup key to be used in the next node.
SAVE end_field, start_field, register//Saves the window region from end_field to start_field to a register. This allows us to use this register as a SET_KEY target in a future node.

The following instructions are example of instructions that might be considered action instructions (e.g. memory access and/or modification instructions), and they have the following format:
MV <bus-var>, <pkt-fld>
MV_IMM <bus-var>, imm_val To initialize the state of the parser hardware, an initial state and start key can be specified, on a per-ingress port basis, in the following way:
START_STATE:
[Port]: [State]
START_KEY:
[State]: [pkt_fld_off_start, pkt_fld_off_end]
END_STATE:
[State-name]: [State-id]

When processing packets, a checksum algorithm may be applied to data within the packets to check for data corruption. In some examples, and in order to perform such operations, data from within packet buffer 431 may be added to a checksum engine that implements the checksum algorithm. Not all data required for the checksum may be available within packet buffer 431 at the same time. Accordingly, some of the required data may be saved for later processing by the checksum engine. To save data, the following instruction may be used, which specifies the start and end fields as parameters:

ADD_TO_CKSUM_fld_start, fld_end

In addition, mechanisms may be included within packet parsing system 410 to a directed graph or parse graph to perform repeated traversals when the parse graph structure is similar (e.g. overlay parsing of headers that follows the underlay headers). Such mechanisms may reduce the number of TCAM entries for sequencing, while still enabling different action operations corresponding to different nodes. Still further, packet parsing system 410 may include mechanism to perform simple additions to register values, or arithmetic operations on buffer entries, thereby enabling, for example, calculation of header lengths.

The program listing illustrated in FIG. 5 uses the conventions described above, and illustrates a program that traverses a parse graph for processing the packet header types illustrated in FIG. 3. By convention in the example of FIG. 5, program execution begins after the "parse_ethernet" label, and continues until the "END" label is encountered. Although the program of FIG. 5 is a simplified example that primarily extracts a source and destination address from an IP v4 header, the program of FIG. 5 illustrates how the previously-described YAML-implemented language constructs might be used to write code to express a directed graph and describe how it is traversed.

Figure 6:
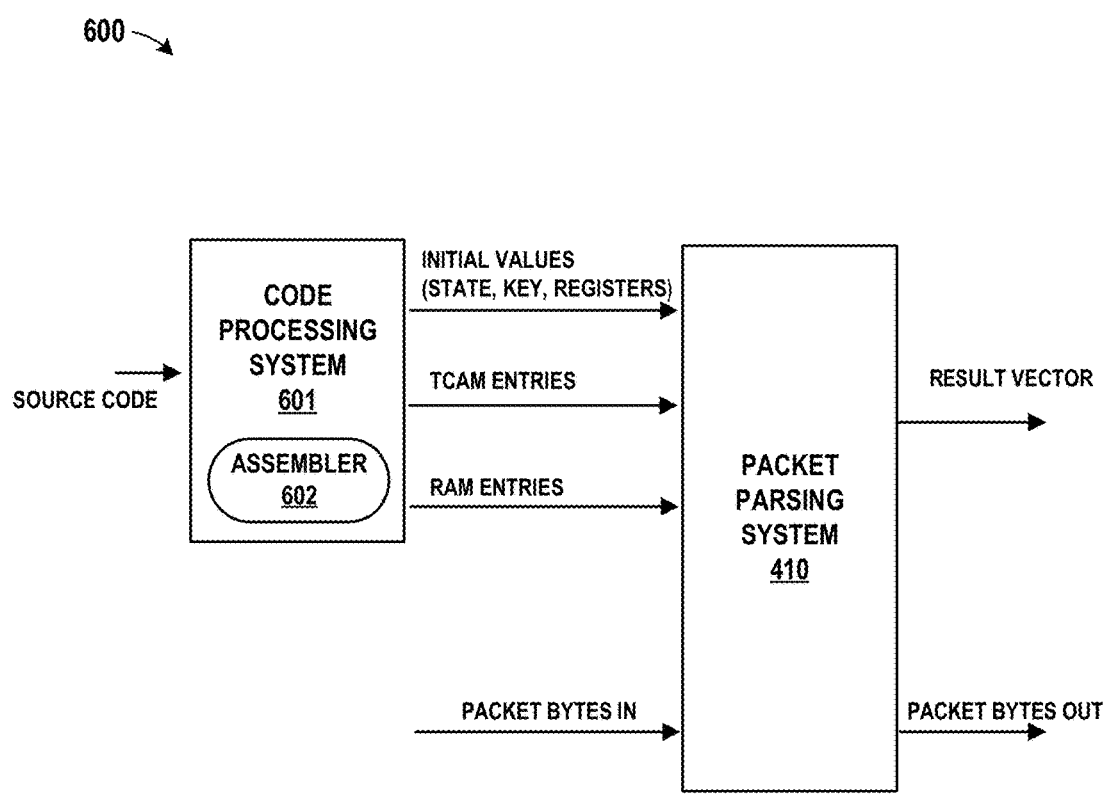
FIG. 6 is a conceptual illustration of an example match-action unit, in accordance with one or more aspects of the present disclosure.

FIG. 6 is a block diagram illustrating an example system that processes source code to parse network packet headers, in accordance with one or more aspects of the present disclosure. In the example of FIG. 6, system 600 includes code processing computing system 601 and packet parsing system 410. Packet parsing system 410 of FIG. 6 may correspond to packet parsing system 410 of FIG. 4, and may be implemented in a manner consistent with or similar to packet parsing system 410 of FIG. 4. In other examples, packet parsing system 410 may be implemented in a manner different than that illustrated in FIG. 4. As in FIG. 4, packet parsing system 410 may generate a parsed result vector for subsequent processing. In some examples, that subsequent processing may involve processing by a forwarding pipeline followed by presenting packets to a packet switch in the manner described in U.S. Provisional Patent Application No. 62/642,798, filed Mar. 14, 2018, entitled "Flexible Processing of Network Packets,", the entire content of which is incorporated herein by reference.

Code processing computing system 601 is a system, device and/or module that translates source code, such as source code having the form illustrated in FIG. 5, into values for storage within components or devices within packet parsing system 410. In some examples, code processing computing system 601 may be one or more computing clusters or a general-purpose computing system programmed to perform various support functions for configuring packet parsing system 410 to parse a directed graph. Accordingly, code processing computing system 601 may be implemented as any suitable computing system, such as one or more control processing clusters, server computers, workstations, appliances, cloud computing systems, and/or other computing systems that may be capable of performing operations and/or functions described in accordance with one or more aspects of the present disclosure.

Assembler module 602 may perform functions relating to translating, assembling, or compiling source code, such as the code illustrated in FIG. 5, into machine readable form. In some examples, such a process may take the form of generating TCAM entries, registry entries, and/or data for storage within other storage locations. Although assembler module 602 may be described in connection with FIG. 6 as primarily translating source code into a different (e.g., machine-readable) form, assembler module 602 may alternatively, or in addition, perform other operations. For instance, assembler module 602 may present a user interface to prompt a user for input when initially configuring source code or other information for traversing a directed graph represented by source code. Assembler module 602 may also present a user interface to present information about the status of one or more source code translations performed by assembler module 602. Accordingly, assembler module 602 may receive information from and output information to one or more other modules included within assembler module 602 (e.g., user interface libraries), and may otherwise interact with and/or operate in conjunction with one or more other modules of code processing computing system 601.

In general, assembler module 602 may perform operations described using software, hardware, firmware, or a mixture of hardware, software, and firmware residing in and/or executing at one or more computing devices. For example, code processing computing system 601 may execute one or more of such modules with multiple processors or multiple devices, or may execute one or more of such modules as a virtual machine executing on underlying hardware. One or more of assembler modules 602 may execute as one or more services of an operating system or computing platform. One or more of assembler modules 602 may execute as one or more executable programs at an application layer of a computing platform. In other examples, functionality provided by a module could be implemented by a dedicated hardware device.

Figure 7:
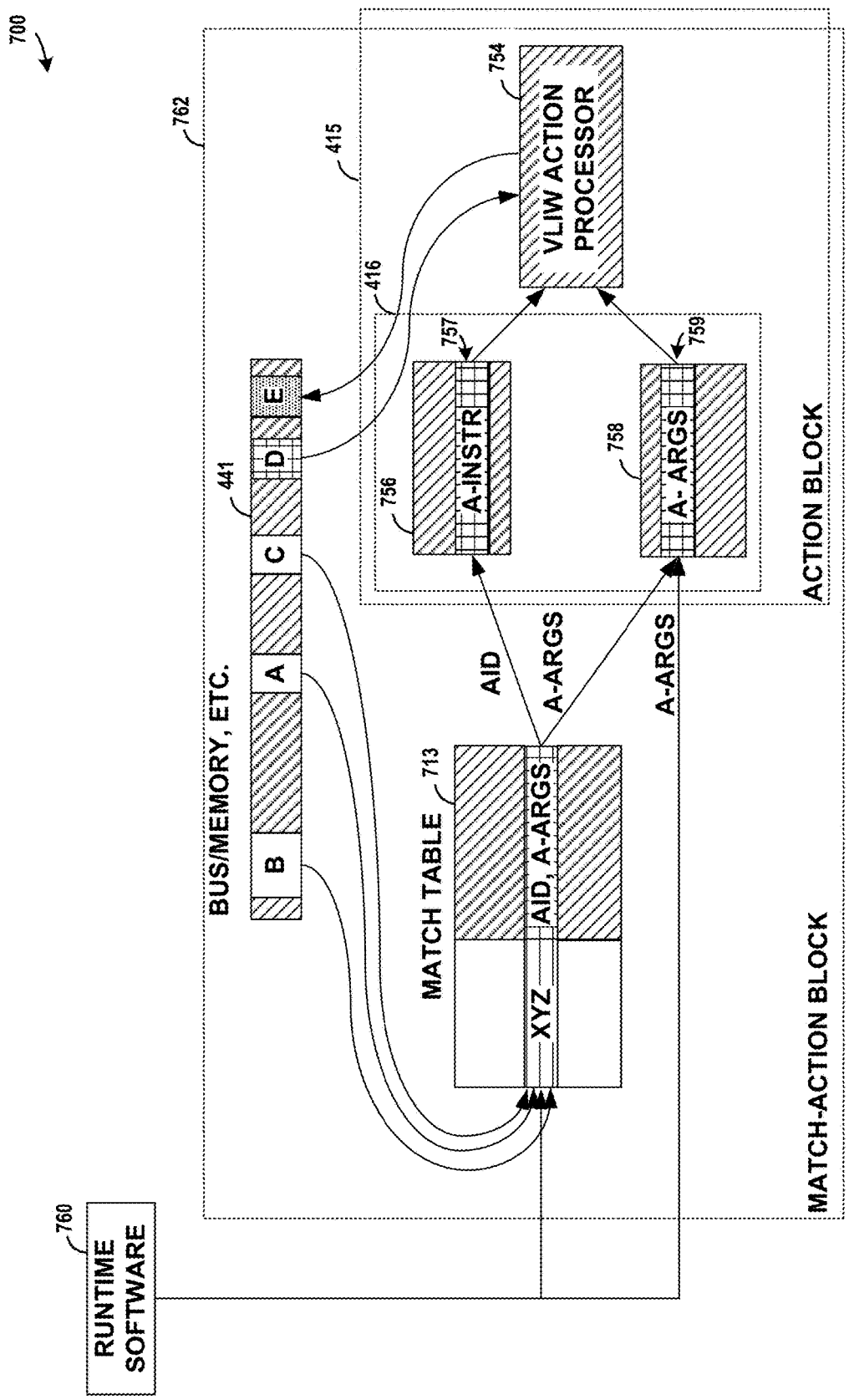
FIG. 7 is a block diagram illustrating an example system that processes source code to parse network packet headers, in accordance with one or more aspects of the present disclosure.

FIG. 7 is a conceptual illustration of example match-action techniques, in accordance with one or more aspects of the present disclosure. FIG. 7 illustrates a packet forwarding pipeline for a match action block 762 that may be realized (e.g., using ASIC architecture) through cascaded match action blocks, where one or more outputs (e.g., processed data) of previously processed match action blocks (e.g. updating of certain values on output bus 441) may be used as an input (e.g., key data, arguments ("ARGS"), etc.) for a current match action block.

In the example of FIG. 7, system 700 includes runtime software 760, and match action block 762. Match-action block 762 may include output bus 441, match table 713, and one or more logic devices 415 (also referred to herein as simply "logic"). One or more logic devices 415 may be implemented in circuitry, for example, but not limited to ASIC architecture. Output bus 441 of FIG. 7 may correspond to output bus 441 of FIG. 4, and may be implemented in a manner consistent with or similar to output bus 441 of FIG. 4. Match table 713 of FIG. 7 may correspond to one or more TCAM devices 413 of FIG. 4, and may be implemented in a manner consistent with or similar to one or more TCAM devices 413 of FIG. 4. One or more logic devices 415 of FIG. 7 may correspond to one or more logic devices 415 of FIG. 4, and may be implemented in a manner consistent with or similar to one or more logic devices 415 of FIG. 4. In some examples, however, one or more of output bus 441, one or more logic devices 415 may be implemented in a manner different than that illustrated in FIG. 4. For instance, match table 713 may be a hash table, direct index, or another match table.

In the example of FIG. 7, match action block 762 may be cascaded multiple times (e.g., logically) to realize a forwarding pipeline. Generally, match action blocks may include, for example, but are not limited to, a mechanism for creating a lookup key from a set of locations on output bus 441. In the example of FIG. 7, the lookup key is constructed by merging the contents of a combination of portion B of data stored in output bus 441, portion A of data stored in output bus 441, and portion C of data stored in output bus 441, which may be simply referred to herein as "BAC." In some examples, the lookup key may be referred herein to as "key data." As such, in this example, match action block 762 uses a key value equal to key data [BAC].

Match table 713 may be configured to permit flexibility in the construction of a lookup key. For example, match table 713 may permit a variable lookup key width and/or the lookup key schema that may be set to accommodate a particular application. Depending upon the type of match table (e.g. Hashtable, TCAM, direct index, etc.), content of match table 713 may also include a mask entry (e.g. for TCAM) to permit ternary matching on the contents of the key data (e.g., [BAC]) retrieved from output bus 441.

Runtime software 760, when executed by circuitry, may cause the circuitry to program entries in match table 713. An example entry generated with runtime software 760 and stored in match table 713 may include a tuple <XYZ, AID, A-ARGS>. In this example, [XYZ] may represent a key value of an entry matching (e.g., equaling) a lookup key (e.g., [BAC]), Action Identifier ("AID") may represent an index into a matching entry (e.g., entry 757) of a Action Instruction Memory 756 ("AIM 756"), and Action-Arguments ("A-ARGS") may represent a pointer to a matching entry (e.g., entry 759) of an array of function arguments 758. As used herein, a matching entry may refer to an entry of match table 713 that includes a key value matching a lookup key (e.g., key data) for a query. In some examples, runtime software 760 may be configured for TCAM. For example, an entry generated with runtime software 760 and stored in match table 713 may include <XYZ, mask, AID, A-ARGS>, where mask may represent a mask entry to achieve a ternary match on contents matching a key value (e.g., [XYZ]).

One or more logic devices 415 may include RAM 416 and VLIW action processor 754. As used herein, a VLIW action processor may be configured to execute multiple VLIW instructions in parallel. RAM 416 of FIG. 7 may correspond to RAM 416 of FIG. 4, and may be implemented in a manner consistent with or similar to RAM 416 of FIG. 4. In some examples, however, RAM 416 may be implemented in a manner different than that illustrated in FIG. 4. As shown, RAM 416 may include AIM 756 and array of function arguments 758. RAM 416 may be referred to herein as "one or more storage devices."

VLIW action processor 754 may have access to a hardware memory block configured to store VLIW instructions. VLIW action processor 754 may perform operations on operands (e.g., flags, nibbles, etc.) from bus locations of output bus 441 (e.g., source/destination). For example, VLIW action processor 754 may operate on operands from portion D of data received from output bus 441 when executing instructions supplied from AIM 756. VLIW action processor 754 may be configured to operate on arguments from function arguments 758. In the example of FIG. 7, VLIW action processor 754 may be configured to operate on operands from output bus 441 (e.g., [D]), execute instructions supplied from AIM 756 (e.g., instructions of entry 757), and/or operate on instructions from function arguments 758 (e.g., arguments of entry 759).

VLIW action processor 754 may be configured to execute a VLIW instruction with a fixed number of micro-ops (e.g., components of the VLIW instruction), where each micro-op has the ability to conditionally update the contents of output bus 441 (e.g., portion E of data stored in output bus 441) at one or more locations. Portion E (and/or other portions of data stored in output bus 441) may serve as input to the next match-action block.

Although not shown in the example of FIG. 7, system 700 may include a compiler block that is configured to express operations of the match action architecture of FIG. 7 using a higher level language. The compiler block may be configured to generate configuration entries for AIM 756. In some examples, the compiler block may be configured to generate mappings between an AID of match table 713 and an A-INSTR of AIM 756 (mapping AID for entry for [XYZ] to entry 757 of AIM 756). The compiler block may be configured to generate layouts for function arguments 758 (e.g., to optimize for packing of operands, or to work around constraints). In some examples, the compiler block may be configured to and provide a lower-level Application Programming Interface (API) to the runtime block to program entries in match table 713 and match action argument blocks of system 700.

Runtime software 760, when executed by circuitry, may cause the circuitry to manage match table 713 and/or function arguments 758. In some examples, function arguments 758 may represent an action argument table between different logical tables (e.g., AID, A-ARGS, etc.) of match table 713 that are mapped into function arguments 758. In some examples, runtime software 760 may be configured to program, with circuitry, entries in both match table 713 and function arguments 758 based on events (e.g. from control plane software, hardware events, etc. (e.g., address learning)).

Techniques described herein may allow one or more of: (a) an ability to perform conditional operations as part of micro-ops in VLIW action processor 754, (b) an ability to perform multi-nibble wide (4-bits) copies as part of micro-ops in VLIW action processor 754, and (c) an ability to treat a certain area on output bus 441 as either single-bit access fields (flags), or as multi-nibble areas (through encoding mechanisms) for use as a lookup key and/or for updating in VLIW action processor 754. As such, techniques described herein may result in one or more of: (a) a reduction in number of basic operation instructions necessary to achieve a given action, (b) an ability to control the actual updates being performed through A-ARGS as a flag block, (c) improved efficiencies in minimization of number of such action blocks necessary as choices per-table for runtime software 760, and (d) a simplification of the table flow graph (e.g., match table 713) due to efficiencies arising from minimization of number of tables (due to complex conditionals in table flow graph being expressible as a result of being able to both set (from the action block entries), and pull (for table lookup key purposes) flags as nibbles.

In the example of FIG. 7, and in accordance with one or more aspects of the present disclosure, system 700 may receive query data from output bus 441. For instance, match table 713 receives a key value [BAC]. In this example, match table 713 specifies a matching entry in response to being queried by the query data. For instance, match table 713 determines that entry [XYZ] matches key [BAC]. In this example, match table 713 outputs an index, which may include an AID, which is an index to entry 757 of AIM 756 and an A-ARGS, which is a pointer to entry 759 of array of function arguments 758.

One or more logic devices 415 receives, from one or more storage devices configured to store operation information for each of a plurality of entries stored in match table 713, operation information specifying one or more operations associated with the matching entry stored in match table 713. For example, AIM 756 outputs an instruction at entry 757, which is received by VLIW action processor 754. In this example, array of function arguments 758 outputs a function argument at entry 759, which is received by VLIW action processor 754.

VLIW action processor 754 may receive one or more operands from output bus 441. For example, VLIW action processor 754 may receive [D] from output bus 441. The one or more operands from output bus 441 may include one or more single bit flags and/or one or more nibbles. In this example, VLIW action processor 754 may generate, based on the one or more instructions from AIM and the one or more operands, processed data. For example, VLIW action processor 754 may execute a VLIW instruction on the one or more operands (from function arguments 758 or output bus 441) to generate the processed data [E] for output bus 441. In some examples, VLIW action processor 754 may execute a VLIW instruction on the one or more operands to generate processed data that represents a query data for another match-action block.

Figure 8:
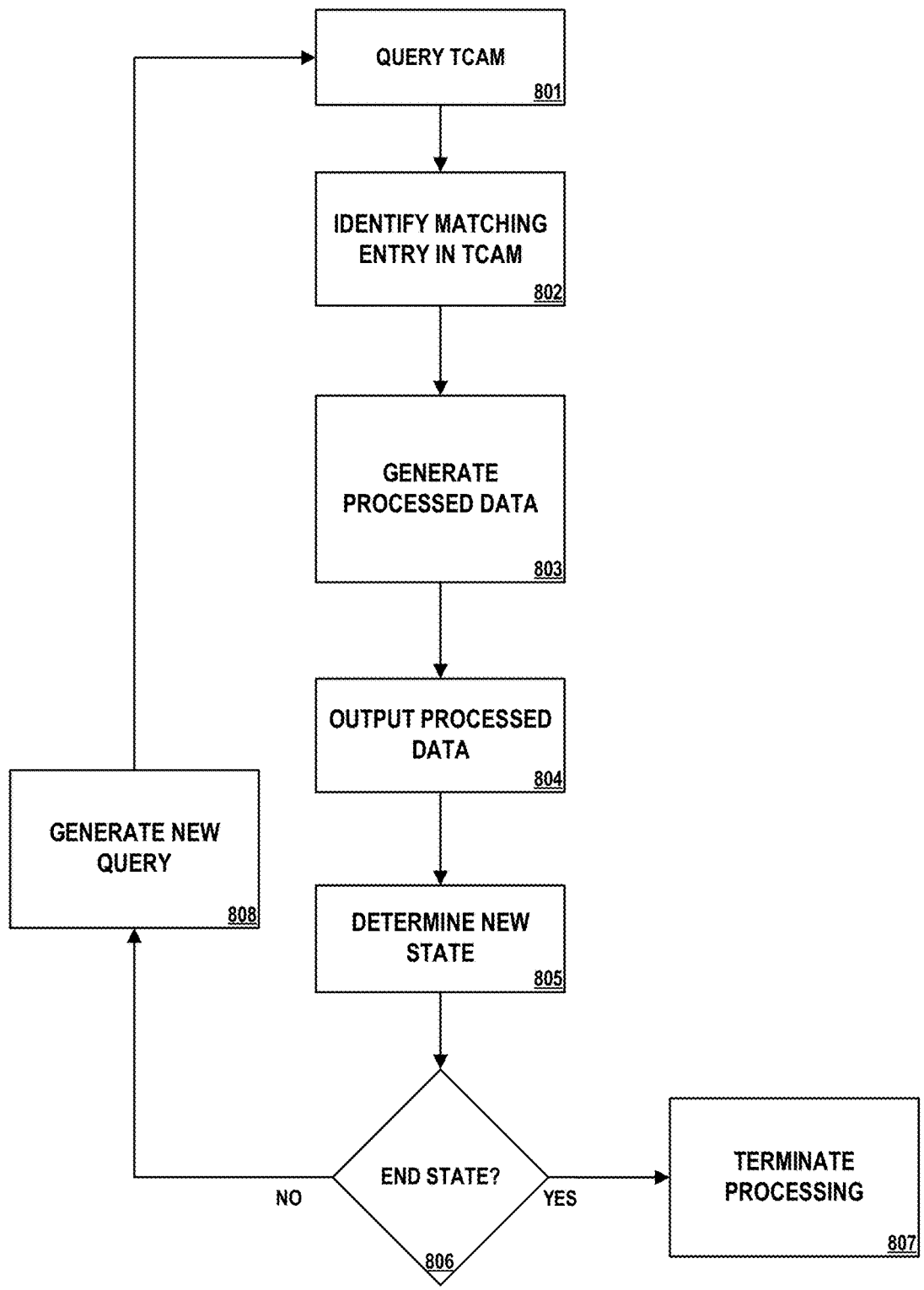
FIG. 8 is a flow diagram illustrating an example process for traversing a parse graph represented by a TCAM-based hardware system, in accordance with one or more aspects of the present disclosure.

FIG. 8 is a flow diagram illustrating an example process for traversing a parse graph represented by a TCAM-based hardware system, in accordance with one or more aspects of the present disclosure. In the example of FIG. 8, the illustrated process may be performed by components within packet parsing system 410 in the context of FIG. 4. In other examples, different operations may be performed, or operations described in connection with FIG. 8 may be performed by one or more other components, modules, systems, and/or devices. Further, in other examples, operations described in connection with FIG. 8 may be merged, performed in a difference sequence, omitted, or may encompass additional operations not specifically illustrated or described.

In the process illustrated in FIG. 8, and in accordance with one or more aspects of the present disclosure, packet parsing system 410 may present a query to a TCAM device (801). For example, with reference to FIG. 4, TCAM query module 419 of packet parsing system 410 may present a query to TCAM 413. In some examples, the query may be composed of a state value and a key value. Initially, the state and key value may be based on values from initialization module 411. The state and key values may later be based on input or data from one or more other devices included within packet parsing system 410 of FIG. 4, including data generated by or included within logic 415, register array 417, and packet buffer 431.

Packet parsing system 410 may identify a matching entry in the TCAM device (802). For example, in FIG. 4, TCAM 413 performs a query based on the input from TCAM query module 419. TCAM 413 determines whether the query matches any of the entries included within TCAM 413, after accounting for any broadening effect that the mask data associated with each entry might have on the query. When one or more matching entries are found, TCAM 413 outputs information about the one or more matching entries to logic 415.

Packet parsing system 410 may generate processed data by performing, based on the matching entry address or address from TCAM 413, one or more operations (803). For example, logic 415 of FIG. 4 may access RAM 416 or other storage locations to determine one or more operations that correspond to the query match identified by TCAM 413. Logic 415 may perform the operations, which may include, for example, incrementing one or more registers within register array 417, performing another arithmetic operation, accessing data from packet buffer 431, and/or storing data within register array 417. Logic 415 may perform the operations using operands from output bus 441 as described in FIG. 7. In some examples, such stored data may be derived from an incoming packet stream; in other examples, such data may be generated and/or accessed from another source. Logic 415 may also cause packet buffer 431 to shift data out of packet buffer 431, thereby queuing new packet data for processing.

Packet parsing system 410 may output the processed data (804). For example, logic 415 may access data within one or more register arrays 417, modify the data as processed data, and write the processed data back to register array 417. In other examples, logic 415 may extract data within packet buffer 431 as processed data and write the data to a portion of output bus 441 as processed data.

Packet parsing system 410 may determine a new state (805). For example, logic 415 accesses one or more storage locations within packet parsing system 410 (e.g., register array 417) and determines a new state based on the current state and/or data stored within the one or more storage locations. Logic 415 outputs information about the new state to TCAM query module 419.

Packet parsing system 410 may determine whether the new state is an "END" state (806). For example, TCAM query module 419 evaluates the new state and compares the new state to an "END" state stored within or received from initialization module 411. If TCAM query module 419 determines that the new state corresponds to an "END" state, TCAM query module 419 may cause packet parsing system 410 to terminate processing (807).

Packet parsing system 410 may generate a new query (808). For example, if TCAM query module 419 determines that the new state does not correspond to the "END" state, TCAM query module 419 presents a new query to TCAM 413. The new query may be composed of a combination of the new state and a new key value. In some examples, the new key value may be accessed from packet buffer 431. In other examples, the new key value may be accessed from within RAM 416 and/or register array 417. Processing may continue until an "END" state is reached.

Figure 9:
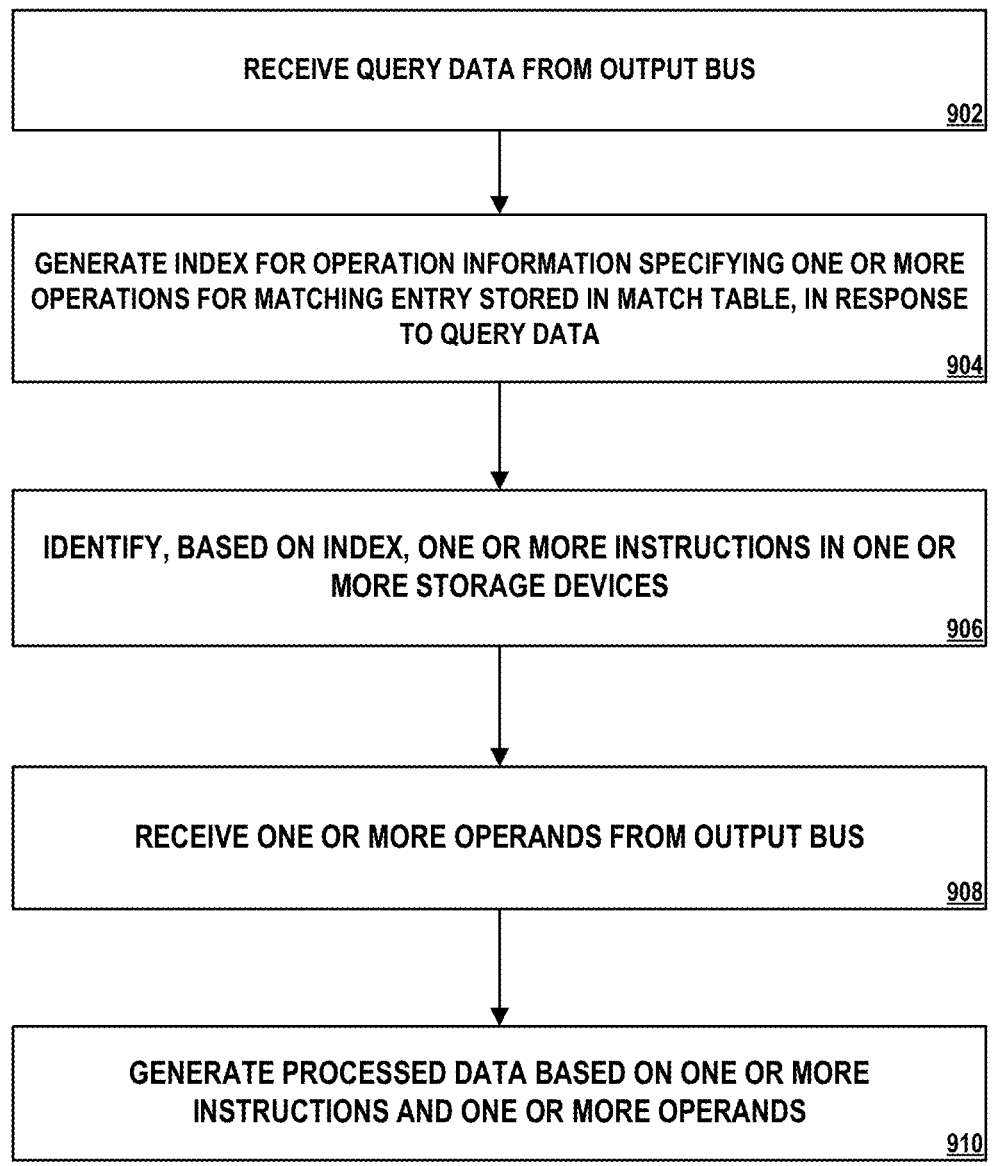
FIG. 9 is a flow diagram illustrating an example process for accounting for operands from an output bus, in accordance with one or more aspects of the present disclosure.

FIG. 9 is a flow diagram illustrating an example process for operands from an output bus, in accordance with one or more aspects of the present disclosure. In the example of FIG. 9, the illustrated process may be performed by components within system 700 in the context of FIG. 7. In other examples, different operations may be performed, or operations described in connection with FIG. 9 may be performed by one or more other components, modules, systems, and/or devices. Further, in other examples, operations described in connection with FIG. 9 may be merged, performed in a difference sequence, omitted, or may encompass additional operations not specifically illustrated or described.

In the process illustrated in FIG. 9, and in accordance with one or more aspects of the present disclosure, match table 713 receives query data from output bus 441 (902). For example, match table 713 receives a search query for key data [BAC]. Match table 713 generates an index for operation information specifying one or more operations for a matching entry stored in match table 713 in response to the query data (904). For example, match table 713 determines key data [BAC] sufficiently matches (e.g., is equal) match table key value [XYZ] and in response to determining key data [BAC] sufficiently matches match table key value [XYZ], determines the entry for [XYZ] is a matching entry. Based on this match, match table 713 generates an AID for entry 757 of AIM 756 and an A-ARGS for entry 759 of array of function arguments 758, each corresponding to match table key value [XYZ].

VLIW action processor 754 identifies, based on the index, one or more instructions in one or more storage devices (e.g., AIM 756 and array of function arguments 758) (906). For example, AIM 756 generates one or more first instructions associated with an AID and array of function arguments 758 generates one or more second instructions associated with A-ARGS. In this example, VLIW action processor 754 may identify one or more instructions of entry 757 based on the AID and entry 759 based on the A-ARGS. VLIW action processor 754 receives one or more operands from output bus 441 (908). VLIW action processor 754 generates, based on the one or more instructions and the one or more operands, processed data (910).

In some examples, the one or more instructions are one or more first instructions for a first action block, the one or more operands are one or more first operands for the first action block, the processed data is first processed data, wherein the logic is further configured to identify one or more second instructions for a second action block in the one or more storage devices (e.g., RAM 416), receive one or more second operands for a second action block from output bus 441, and generate, based on the first processed data, the one or more second instructions and the one or more second operands, second processed data.

In some examples, the one or more operands may include one or more single bit flags. Additionally, or alternatively, the one or more operands may include one or more nibbles. As used herein, a nibble may refer to a 4-bit value.

In some examples, the logic may include VLIW action processor 754 configured to execute a plurality of VLIW instructions in parallel and using the one or more operands. In some examples, VLIW action processor 754 may be configured to execute the VLIW instruction with a fixed number of micro-operations. Each micro-operation of the fixed number of micro-operations may be configured to conditionally update contents of output bus 441.

In some examples, match table 713 comprises a TCAM and at least a portion of the key value is configured to be masked in response to the TCAM being queried by the query data. In some examples, match table 713 may include a Hashtable. Match table 713 may include a direct index.

The one or more storage devices (e.g., RAM 416) may include AIM 756. In this example, an entry of match table 716 may include an AID specifying an index into a respective entry (e.g., entry 757) of AIM 756. In this example, to identify one or more instructions in one or more logic devices 415, VLIW action processor 754 may be configured to identify the respective entry of AIM 756.

In some examples, the one or more storage devices (e.g., RAM 416) may include an array of function arguments 759. In this example, an entry of match table 713 may include an action argument (e.g., A-ARGS) pointer specifying an index into a respective entry (e.g., 759) of array of function arguments 758. In this example, to identify one or more instructions in one or more logic devices 415, VLIW action processor 754 may be configured to identify the respective entry (e.g., entry 759) of the array of function arguments 758.

In some examples, the output bus may include a packet buffer configured to store information about incoming packets. In this example, one or more logic devices 415 may be configured to parse a network packet header stored within the packet buffer. In this example, the network packet headers may include at least one of an Ethernet packet header, a Virtual Local Area Network (VLAN) packet header, and an IP version 4 packet header. In some examples, one or more logic devices 415 may be configured to extract the query data from the packet buffer. In some examples, output bus 441 may include a parsed result vector. In this example, one or more logic devices 415 may be configured to write data to the parsed result vector.

In some examples, the query data may include state data and key data. In this example, one or more logic devices 415 may be configured to receive the state data and the key data, determine, based on the one or more instructions and the one or more operands, new state data, determine, based on the one or more instructions and the one or more operands, a new key value, and output new query data comprising an indication of the new state data and the new key value. In some examples, one or more logic devices 415 may be configured to access data from the output bus.

In some examples, one or more logic devices 415 may be configured to determine an initial value for the state data, determine an initial value for the key data, initialize the match table with match table entry data, initialize the one or more storage devices with initial storage device values, identify an end state, and determine if the state data matches the end state.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIG. 1, FIG. 2, FIG. 4, and/or FIG. 6) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. An apparatus comprising:
   an output bus;
   a match table configured to store a plurality of entries, each entry of the plurality of entries including a key value, wherein the match table specifies a matching entry in response to being queried by query data received from the output bus, wherein the query data comprises state data and key data;
   one or more storage devices configured to store operation information for each of the plurality of entries stored in the match table, wherein the operation information specifies one or more instructions associated with each respective entry in the plurality of entries stored in the match table; and
   logic connected to the output bus, the match table, and the one or more storage devices, wherein the logic is configured to:
      receive one or more operands from the output bus;
      identify one or more instructions in the one or more storage devices; and
      generate, based on the one or more instructions and the one or more operands, processed data, and
   wherein the logic is further configured to:
      receive the state data and the key data;
      determine, based on the one or more instructions and the one or more operands, new state data;
      determine, based on the one or more instructions and the one or more operands, a new key value; and
      output new query data comprising an indication of the new state data and the new key value.

2. The apparatus of claim 1, wherein the one or more instructions are one or more first instructions for a first action block, wherein the one or more operands are one or more first operands for the first action block, wherein the processed data is first processed data, and wherein the logic is further configured to:
  identify one or more second instructions for a second action block in the one or more storage devices;
  receive one or more second operands for the second action block from the output bus; and
  generate, based on the first processed data, the one or more second instructions and the one or more second operands, second processed data.

3. The apparatus of claim 1,
  wherein the one or more operands comprises one or more single bit flags; or
  wherein the one or more operands comprises one or more nibbles.

4. The apparatus of claim 1, wherein the logic comprises a Very Long Instruction Word (VLIW) action processor configured to execute a plurality of VLIW instructions in parallel and using the one or more operands.

5. The apparatus of claim 4,
  wherein the VLIW action processor is configured to execute the VLIW instruction with a fixed number of micro-operations; and
  wherein each micro-operation of the fixed number of micro-operations is configured to conditionally update contents of the output bus.

6. The apparatus of claim 1,
  wherein the match table comprises a ternary content-addressable memory (TCAM) and wherein at least a portion of the key value is configured to be masked in response to the TCAM being queried by the query data;
  wherein the match table comprises Hashtable; or
  wherein the match table comprises a direct index.

7. The apparatus of claim 1,
  wherein the one or more storage devices comprises an action instruction memory (AIM);
  wherein an entry of the match table comprises an Action Identifier (AID) specifying an index into a respective entry of the AIM; and
  wherein, to identify the one or more instructions in the one or more storage devices, the logic is configured to identify the respective entry of the AIM.

8. The apparatus of claim 1,
  wherein the one or more storage devices comprises an array of function arguments;
  wherein an entry of the match table comprises an action argument pointer specifying an index into a respective entry of the array of function arguments; and
  wherein, to identify the one or more instructions from the one or more storage devices, the logic is configured to identify the respective entry of the array of function arguments.

9. The apparatus of claim 1, wherein the output bus comprises a packet buffer configured to store information about incoming packets, and wherein, to generate the processed data, the logic is further configured to:
  parse a network packet header stored within the packet buffer, wherein the network packet headers include at least one of an Ethernet packet header, a VLAN packet header, and an IP version 4 packet header.

10. The apparatus of claim 9, wherein, to generate the processed data, the logic is further configured to:
  extract the query data from the packet buffer.

11. An apparatus comprising:
  an output bus, wherein the output bus comprises a packet buffer configured to store information about incoming packets and a parsed result vector;
  a match table configured to store a plurality of entries, each entry of the plurality of entries including a key value, wherein the match table specifies a matching entry in response to being queried by query data received from the output bus;
  one or more storage devices configured to store operation information for each of the plurality of entries stored in the match table, wherein the operation information specifies one or more instructions associated with each respective entry in the plurality of entries stored in the match table; and
  logic connected to the output bus, the match table, and the one or more storage devices, wherein the logic is configured to:
    receive one or more operands from the output bus;
    identify one or more instructions in the one or more storage devices;
    generate, based on the one or more instructions and the one or more operands, processed data, wherein, to generate the processed data, the logic is further configured to parse a network packet header stored within the packet buffer, wherein the network packet headers include at least one of an Ethernet packet header, a VLAN packet header, and an IP version 4 packet header; and
    write data to the parsed result vector.

12. The apparatus of claim 1, wherein, to determine the new key value, the logic is further configured to:
  access data from the output bus.

13. The apparatus of claim 1, wherein the logic is further configured to:
  determine an initial value for the state data;
  determine an initial value for the key data;
  initialize the match table with match table entry data;
  initialize the one or more storage devices with initial storage device values;
  identify an end state; and
  determine if the state data matches the end state.

14. A method comprising:
  generating, by a match table, an index for operation information specifying one or more operations for a matching entry stored in the match table in response to being queried by query data, wherein the query data comprises state data and key data;
  identifying, by logic implemented in circuitry and based on the index, one or more instructions in one or more storage devices;
  receiving, by the logic, one or more operands from the output bus;
  generating, by the logic, processed data based on the one or more instructions and the one or more operands;
  receiving, by the logic, the state data and the key data;
  determining, by the logic and based on the one or more instructions and the one or more operands, new state data;
  determining, by the logic and based on the one or more instructions and the one or more operands, a new key value; and
  outputting, by the logic, new query data comprising an indication of the new state data and the new key value.

15. The method of claim 14, wherein the one or more instructions are one or more first instructions for a first action block, wherein the one or more operands are one or more first operands for the first action block, and wherein the processed data is first processed data, the method further comprising:
- identifying, by the logic, one or more second instructions for a second action block in the one or more storage devices;
- receiving, by the logic, one or more second operands for the second action block from the output bus; and
- generating, by the logic, based on the first processed data, the one or more second instructions and the one or more second operands, second processed data.

16. The method of claim 14,
- wherein the one or more operands comprises one or more single bit flags; or
- wherein the one or more operands comprises one or more nibbles.

17. The method of claim 1, wherein the logic comprises a Very Long Instruction Word (VLIW) action processor configured to execute a plurality of VLIW instructions in parallel and using the one or more operands.

18. The method of claim 17,
- wherein the VLIW action processor is configured to execute the VLIW instruction with a fixed number of micro-operations; and
- wherein each micro-operation of the fixed number of micro-operations is configured to conditionally update contents of the output bus.

19. The method of claim 14, wherein determining the new key value comprises accessing data from the output bus.

20. The method of claim 14, further comprising:
- determining, by the logic, an initial value for the state data;
- determining, by the logic, an initial value for the key data;
- initializing, by the logic, the match table with match table entry data;
- initializing, by the logic, the one or more storage devices with initial storage device values;
- identifying, by the logic, an end state; and
- determining, by the logic, if the state data matches the end state.

* * * * *